(12) United States Patent
Lacour

(10) Patent No.: US 7,911,102 B2
(45) Date of Patent: Mar. 22, 2011

(54) MAGNETIC COUPLING WITH HYSTERESIS, PARTICULARLY FOR WINDING/UNWINDING DEVICES

(75) Inventor: Gilles Lacour, Belley (FR)

(73) Assignee: Delachaux S.A., Gennevilliers (FR)

( * ) Notice: Subject to any disclaimer, the term of this patent is extended or adjusted under 35 U.S.C. 154(b) by 225 days.

(21) Appl. No.: 12/225,224

(22) PCT Filed: Mar. 29, 2007

(86) PCT No.: PCT/EP2007/053036
§ 371 (c)(1),
(2), (4) Date: Sep. 16, 2008

(87) PCT Pub. No.: WO2007/113210
PCT Pub. Date: Oct. 11, 2007

(65) Prior Publication Data
US 2009/0284091 A1 Nov. 19, 2009

(30) Foreign Application Priority Data
Mar. 30, 2006 (FR) ...................................... 06 02753

(51) Int. Cl.
*H02K 5/173* (2006.01)
(52) U.S. Cl. ................ 310/103; 310/156.75; 310/156.83
(58) Field of Classification Search .......... 310/103–105, 310/156.82, 156.83, 156.74, 156.75
See application file for complete search history.

(56) References Cited

U.S. PATENT DOCUMENTS 2,885,126 A * 5/1959 William ........................ 222/333
6,129,193 A   10/2000 Link

FOREIGN PATENT DOCUMENTS

| EP | 1026815 A | 8/2000 |
| FR | 1602519 A | 12/1970 |
| JP | 57-10211  | * 1/1982 |

OTHER PUBLICATIONS

Patent Abstract, JP-57-10211, Jan. 19, 1982.*

* cited by examiner

*Primary Examiner* — Dang D Le
(74) *Attorney, Agent, or Firm* — Blakely, Sokoloff, Taylor & Zafman LLP

(57) ABSTRACT

A magnetic coupler with hysteresis (1) has an inductor subassembly (2) and an armature subassembly (6) that are capable of rotating one with respect to the other. The inductor subassembly has a plurality of magnetic poles and the armature subassembly (6) has one or more armature permanent magnets with hysteresis (11, 12). The invention is notable in that the or each armature magnet is produced in the form of a ring of one piece in magnetic material with vertical hysteresis and has through-slots for attenuating radial currents each running in the direction of the circumferential spread of the ring. Application to limiting heating and reducing axial bulk.

Figure 1:
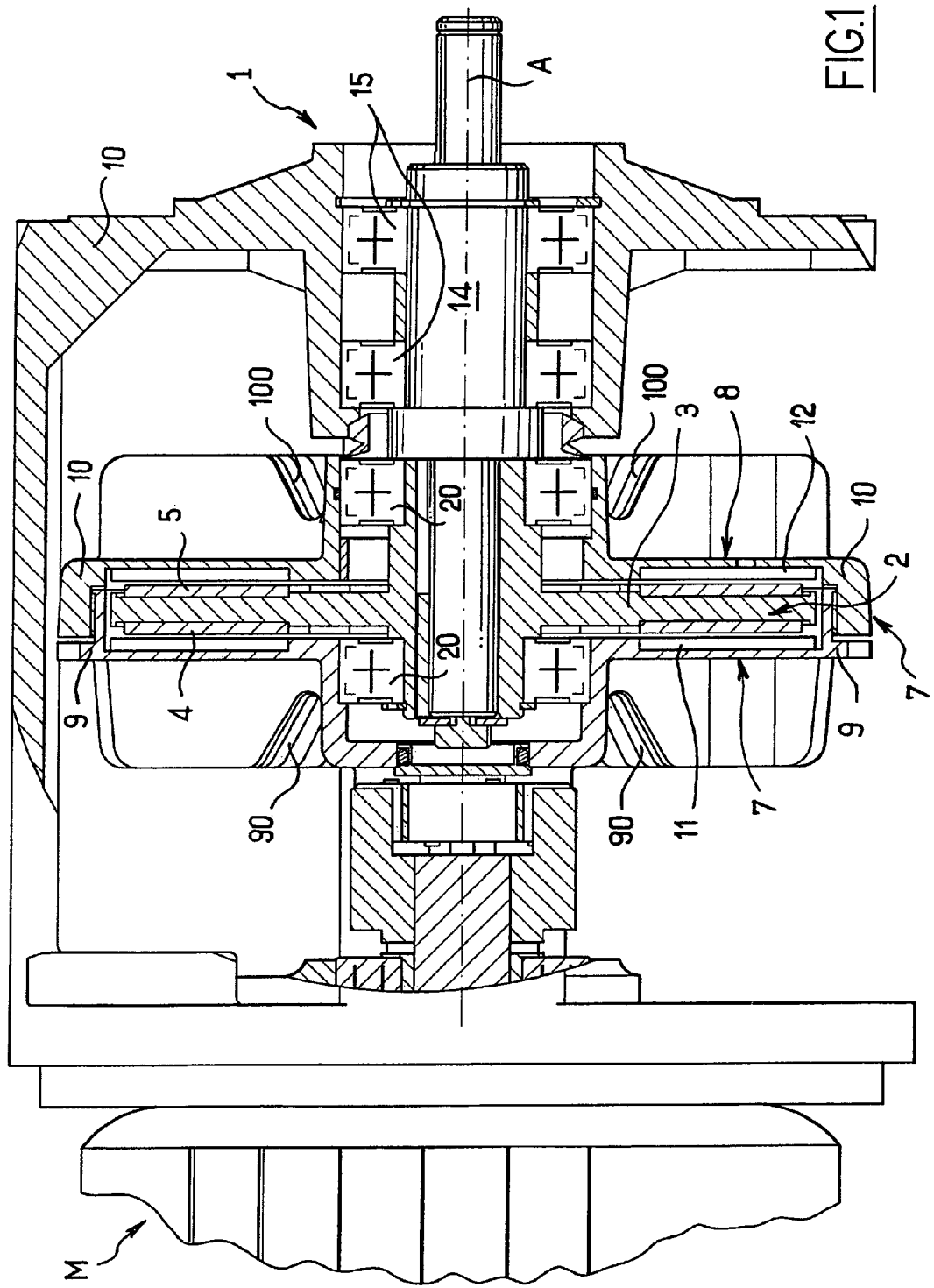

12 Claims, 2 Drawing Sheets

MAGNETIC COUPLING WITH HYSTERESIS, PARTICULARLY FOR WINDING/UNWINDING DEVICES

The present patent application is a Utility claiming the benefit of Application No. PCT/EP2007/053036, filed Mar. 29, 2007.

The invention relates to the field of magnetic couplings with hysteresis, especially for driving unwinder-rewinder devices with a torque minimally variable over a wide range of speeds.

Document FR 1 602 519 describes an unwinder-rewinder device employing such couplers. Each coupler comprises two coaxial elements rotating one relative to the other, specifically an inductor developing an alternating multipolar magnetic field whereof the poles follow one another according to symmetry of revolution about the axis of revolution, and the other element is made of ferromagnetic material, preferably magnetically hard and not previously magnetised. The poles of the inductor are formed by electro-magnets or preferably by permanent magnets. During unwinding or rewinding the drive motor can be kept at normal speed due to the possibilities of sliding the receiver elements or elements guided relative to the motor elements or leading elements. According to this document, the transmitted torque varies little.

Experience does show that at high slip speeds, above all when unwinding, the transmitted torque grew significantly and intrusively with the slip speed, with an increase exceeding for example 60% for slip speeds greater than 2000 rpm.

The same applies for the coupler described in document EP 1 026 815, which comprises an inductor element and an armature element suitable for rotating one relative to the other, the inductor element having several magnetic poles and the armature element one or more permanent armatures with hysteresis.

Document FR-A-2 607 333 likewise discloses a coupler magnetic of the same general type, but focussed on giving a transmitted torque depending much less on slip speed.

According to this document, the armature sub-assembly of the coupler is in part at least constituted by a moulded paste containing particles of magnets with hysteresis and an electrically insulating binder such as epoxy resin, this paste being held on a support in the form of a disc having heat dissipation facilities.

The result is that variations in torque, originating essentially from Foucault currents induced by variations in magnetic flux in the armature sub-assembly, are substantially diminished.

However, in this known coupler, on observe encore in the armature sub-assembly significant heating originating from the fact that the energy dissipated in the hysteresis cycles is poorly transmitted by dissipation facilities due to poor thermal conductivity of the electrically insulating binder, and which necessitate a wider design for this armature sub-assembly to avoid excessive temperatures.

On the other hand, document U.S. Pat. No. 6,129,193 describes a coupler with hysteresis whereof the inductor element is constituted by a series of electromagnetic poles separated angularly and whereof the armature element is constituted by a series of permanent armature magnets with hysteresis, also separated angularly. Each of these permanent magnets is in the form of a portion of crown made of magnetic material with hysteresis cycles and is mounted on a radially external crown made of plastic in which is embedded a second crown made of magnetic material ensuring a magnetic bond between the different permanent magnets. In addition the surface of each permanent magnet au regard of the inductor element comprises a series of radial slots for channeling the magnetic flux, at the same time attenuating the Foucault currents on this surface alone, and reinforcing the synchronisation torque between the armature element and the inductor element. On the other surfaces of the magnet as well as on the magnetic crown binding them, the Foucault currents remain present without limitation. On the one hand, this does not permit continuous sliding between armature and inductor and, on the other hand, regular transmitted torque relative to the relative angular positioning of the inductor element and of the armature element.

The aim of the present invention is to eliminate the drawbacks of the prior art and propose a novel coupler, at the same time ensuring good regularity of torque, with improved performance in terms of heating.

Another aim is to better ensure the regularity of the transmitted torque, and this in wider ranges of variations of the speed (given here that these variations in the prior art were limited by the necessity to limit heating due to considerable thermal differential dilation between the binder of the paste and the metallic material constituting the armature support).

To this end, a magnetic coupler with hysteresis is proposed according to the invention, comprising an inductor sub-assembly and an armature sub-assembly suitable for rotating relative to one another, the inductor sub-assembly having a plurality of magnetic poles and the armature sub-assembly having one or more permanent armature magnets with hysteresis, characterised in that the or each armature magnet is made in the form of a crown in a single piece of magnetic material with vertical hysteresis cycle and comprises attenuation through-slots of radial currents each extending in the direction of the circumferential spread of the crown.

Certain preferred though non-limiting aspects of this coupler are the following:
- a set of slots offset relative to one another is provided in the radial dimension of the crown, between its outer edge and its inner edge.
- each slot has an angular spread substantially greater than that of a pole of the inductor sub-assembly.
- the slots extend according to circles concentric with the centre of the crown.
- the circles are essentially equidistant from one another.
- the or each armature magnet is made of magnetic iron-chromium-cobalt alloy.
- the or each armature magnet has a ratio between crown width and thickness greater than approximately 3.
- the or each armature magnet is borne by a flange made of non-magnetic metallic material with high electric resistivity, in particular greater than 5 µohm·cm, and with high thermal conductivity.
- the flange is made of stainless steel.
- there is close surface contact between the or each armature magnet and the associated flange.
- there is a thermally conductive paste between the or each armature magnet and the associated flange.
- the or each flange has, opposite the armature magnet, heat-dissipation fins.
- a number of slots per concentric level (F1-F4) and a number of magnetic poles of the inductor sub-assembly are not multiples of one another.

Figure 2:
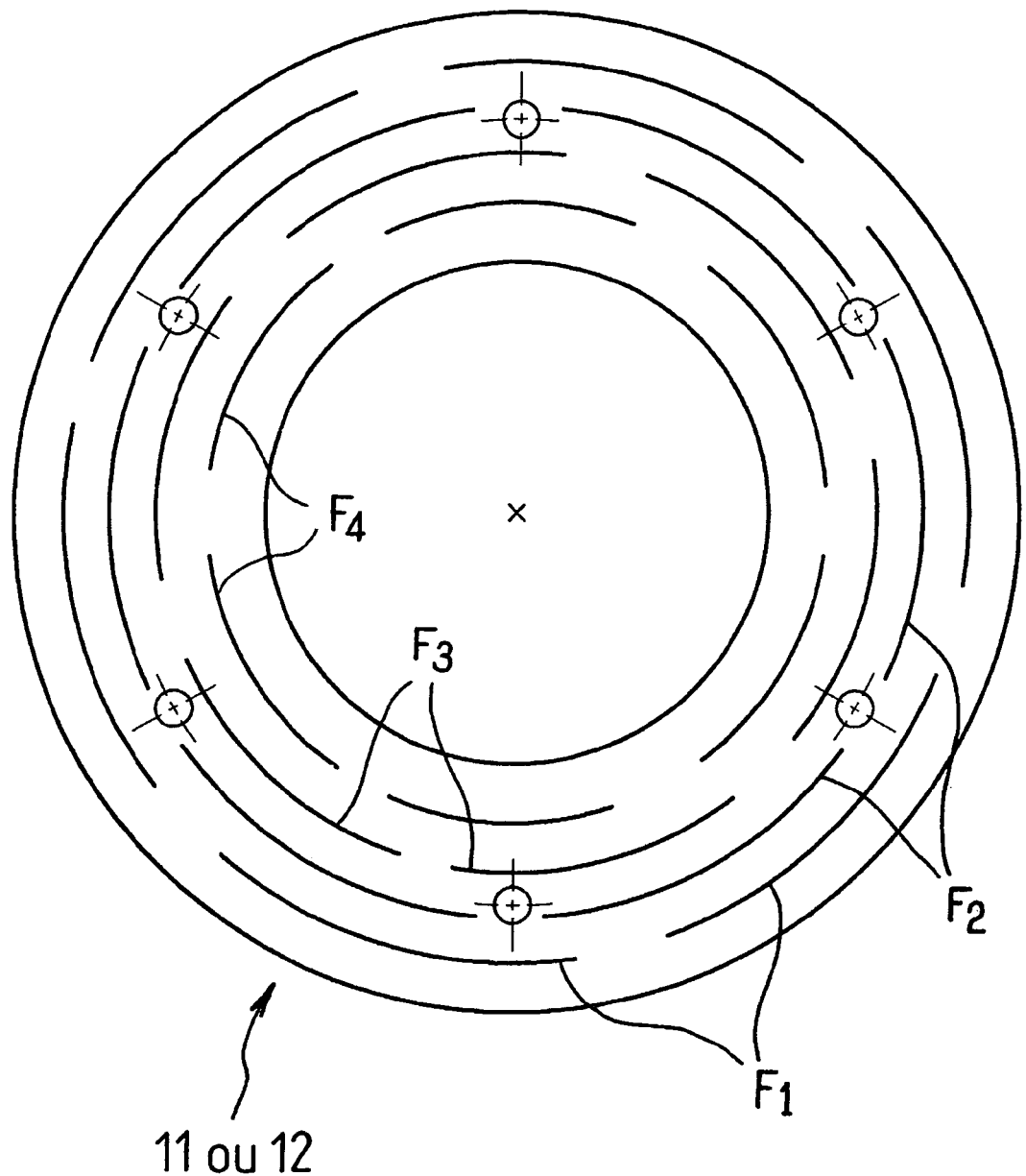

Other aspects, aims and advantages of the present invention will best emerge from the following detailed description of a preferred embodiment of the latter, given by way of non-limiting example and made in reference to the attached diagrams, in which:

FIG. 1 is a view in longitudinal axial section of a magnetic coupler with hysteresis according to the present invention, and FIG. 2 is a frontal elevation of a magnetic armature element of the coupler of FIG. 1.

In reference to FIG. 1, this shows a magnetic coupler with hysteresis designated overall by reference numeral 1, which comprises an inductor sub-assembly 2 in the general shape of a disc and an armature sub-assembly 6 comprising two assembled armature parts 7 and 8 situated on either side of the inductor sub-assembly, the inductor sub-assembly and the armature sub-assembly able to rotate relative to one another according to an axis A by means of rollers 20.

The inductor sub-assembly 2 is constituted by a plateau 3 made of ferromagnetic material bearing two permanent magnet zones in the form of crowns 4 and 5, and extending in an output shaft 14 able to rotate between the rollers 15. The permanent magnets 4 and 5 define alternate magnetic poles of regular angular spacing, and for example 24 poles each occupying an angular width of 15°.

The two armature parts 7, 8 respectively comprise two armatures 11 and 12 mounted on respective supports or flanges 9 and 10.

Each armature 11, 12 is formed by a solid permanent magnet with hysteresis. An iron-chromium-cobalt alloy, having between 26 and 30% by weight of chromium, from 7 to 10% by weight of cobalt, the complement being iron is preferably selected as magnet material. A property of such a magnetic alloy is a vertical hysteresis cycle, and in particular residual induction of preferably between 8000 and 13000 Gauss for a coercitive field strength of between 50 and 800 Oersteds, and more preferably between 9000 and 12000 Gauss for a coercitive field strength of between 50 and 300 Oersteds.

Such magnets also have high electric resistivity, typically greater than or equal to approximately 40 μOhm·cm and more preferably greater than or equal to approximately 60 μOhm·cm.

Another property of this type of magnet is a reversible induction modification coefficient of less than approximately 0.5%, and more preferably less than approximately 0.05%.

This type of magnet generates significant torque with minimal sensitivity to temperature with relatively weak magnetic field inductors. This advantageously reduces the volume of the inductor magnets and their thickness in particular.

Also, the armature supports 9 and 10 are made of a material having high electric resistivity, typically greater than 5 μohm·cm, such as stainless steel of the 304 series.

This limits recirculation of currents in the armatures 11, 12 and thus limits heating as well as dependence on torque with relative speed between inductors and armatures.

The supports 9 and 10 are provided on their outer faces with cooling fins 90, 100 participating in evacuation of the heat engendered in the armatures. This heat evacuation is carried out all the better since proper thermal conduction is assured between the magnets 11, 12 and the respective supports 9, 10. This can be done either by close surface contact between these pieces, with appropriate shaping precision, or if necessary by adding between them a high thermal conduction paste.

In addition, and as shown in FIG. 2, each armature magnet 11, 12 has the form of a solid crown housing a series of through-slots intended to limit the circulation of radial Foucault currents in these magnets, and thus limit the heating generated in said magnets.

These slots, having the least possible width, are advantageously made according to a cut-out technique by a pressurised or laser water jet. In the present preferred example they are arranged on concentric circles uniformly spaced between the exterior and interior of the magnet in the form of a crown.

Here, four levels of slots F1 to F4 are provided, the outermost slots being designated by F1 and the innermost slots being designated by F4. The circles on which these slots are situated are uniformly spaced between the exterior of the crown and the interior of the crown. In addition, the slots of one level overlap with the slots of an adjacent level, given that the spread of the slots along the respective circles is preferably cumulatively greater than the spread of interruptions which separate the slots and ensure mechanical cohesion of the piece.

In addition, each slot preferably extends in the circumferential direction, over a plurality of adjacent poles.

In the present example six slots per level are provided, each extending over an angular amplitude of the order of 40 to 50° with angular offsetting of around 15° from the slots located at a certain level relative to those located at a level immediately adjacent, as illustrated.

Because of the material with vertical hysteresis cycle used for the armature magnets 11, 12, which helps reduce the size and particularly the thickness of the inductor magnets, because of the barely electrically conductive material utilised for the media 9, 10, and finally because of the formation of radial current-limitation slots in the armatures, extremely thin armatures can be made, typically with a ratio between the width of the crowns in the radial direction and their thickness according to the axis greater than 3, without causing substantial heating. The result is that the coupler can be made more economically, and with a reduced axial bulk.

Driving the armature sub-assembly 6 with the output shaft of an electric motor M illustrated partially to the left in FIG. 1 is achieved by means of a conventional coupling which does not need to be described in detail. The inductor sub-assembly is solid in rotation with an output shaft 14 mounted in a chassis 10 of the coupler by means of rollers 15.

It is understood that the present invention is not limited to the embodiment described hereinabove and illustrated in the diagrams. The expert will know how to contribute numerous variants and modifications.

In particular, a coupler can be made with
  a single active face to reduce costs, especially when the torque to be transmitted is not too high;
  a number of slots per level and a number of magnetic poles which are not multiples of one another;
  a number of fixing screws for the crown of the armature on its supports (9, 10) and a number of magnetic poles which are not multiples of one another.

The invention claimed is:
1. A magnetic coupler with hysteresis (1) comprising an inductor sub-assembly (2) and an armature sub-assembly (6) suitable for rotating relative to one another, the inductor sub-assembly having a plurality of magnetic poles and the armature sub-assembly (6) having one or more permanent armature magnets with hysteresis (11, 12), wherein each armature magnet is made in the form of a crown in a single piece of a magnetic material with vertical hysteresis cycle and comprises through-slots (F1-F4) for attenuating radial currents, each extending in the direction of the circumferential spread of the crown,
  wherein there is a set of offset slots (F1-F4) one relative to the other in the radial dimension of the crown, between its outer edge and its inner edge.

2. The coupler according to claim 1, wherein each slot has an angular spread substantially greater than that of a pole of the inductor sub-assembly.

3. The coupler according to claim 1, wherein the slots extend according to circles concentric with the centre of the crown.

4. The coupler according to claim 3, wherein the circles are essentially equidistant from one another.

5. The coupler according to claim 1, wherein the or each armature magnet (11, 12) is made of magnetic iron-chromium-cobalt alloy.

6. The coupler according to claim 1, wherein the or each armature magnet has a ratio between crown width and thickness greater than approximately 3.

7. The coupler according to claim 1, wherein the or each armature magnet is borne by a flange (9, 10) made of non-magnetic metallic material with high electric resistivity, in particular greater than 5 μohm·cm, and with high thermal conductivity.

8. The coupler according to claim 7, wherein the flange is made of stainless steel.

9. The coupler according to claim 7, wherein there is close surface contact between the or each armature magnet and the associated flange.

10. The coupler according to claim 7, wherein a thermally conductive paste is provided between the or each armature magnet and the associated flange.

11. The coupler according to claim 7, wherein opposite the armature magnet the or each flange has heat dissipation fins (90, 100).

12. The coupler according to claim 1, wherein a number of slots per concentric level (F1-F4) and a number of magnetic poles of the inductor sub-assembly are not multiples of one another.

* * * * *